(12) United States Patent
Onfroy et al.

(10) Patent No.: US 8,031,596 B2
(45) Date of Patent: Oct. 4, 2011

(54) ROUTER ASSOCIATED TO A SECURE DEVICE

(75) Inventors: Emmanuel Onfroy, Colombes (FR); Evren Bulut, Fameck (FR); Bertrand Marquet, Nozay (FR); José Araujo, Nozay (FR); Arnaud Ansiaux, Nozay (FR)

(73) Assignee: Alcatel Lucent, Paris (FR)

( * ) Notice: Subject to any disclaimer, the term of this patent is extended or adjusted under 35 U.S.C. 154(b) by 160 days.

(21) Appl. No.: 12/455,708

(22) Filed: Jun. 5, 2009

(65) Prior Publication Data

US 2010/0014515 A1 Jan. 21, 2010

(51) Int. Cl.
*H04L 12/26* (2006.01)
*H04L 12/28* (2006.01)

(52) U.S. Cl. ........................................ 370/230; 370/401

(58) Field of Classification Search .................. 370/230, 370/252, 254, 255, 389, 401
See application file for complete search history.

(56) References Cited

U.S. PATENT DOCUMENTS

| | | | |
|---|---|---|---|
| 6,851,054 B2 * | 2/2005 | Wheeler et al. | 713/176 |
| 6,931,018 B1 * | 8/2005 | Fisher | 370/401 |
| 7,330,468 B1 * | 2/2008 | Tse-Au | 370/389 |
| 7,415,512 B1 * | 8/2008 | Moon | 709/220 |
| 2002/0191619 A1 * | 12/2002 | Shafer | 370/401 |
| 2005/0144467 A1 * | 6/2005 | Yamazaki | 713/189 |
| 2006/0028996 A1 * | 2/2006 | Huegen et al. | 370/252 |
| 2006/0101506 A1 | 5/2006 | Gallo et al. | |
| 2007/0192844 A1 * | 8/2007 | Chen et al. | 726/11 |
| 2009/0024758 A1 * | 1/2009 | Levy-Abegnoli et al. | 709/237 |
| 2009/0060199 A1 * | 3/2009 | von Mueller et al. | 380/278 |
| 2009/0125627 A1 * | 5/2009 | Ford | 709/227 |
| 2009/0158011 A1 * | 6/2009 | Jennings et al. | 712/220 |

FOREIGN PATENT DOCUMENTS

| | | |
|---|---|---|
| EP | 1179915 | 2/2002 |
| EP | 1599019 | 11/2005 |

* cited by examiner

*Primary Examiner* — Hong Cho
(74) *Attorney, Agent, or Firm* — Carmen Patti Law Group, LLC

(57) ABSTRACT

The invention concerns a router associated to a secure device (DC) and included in a communication network (RC), comprising an interface (IRT) to communicate with the secure device following an authentication of the router by the secure device, and comprising a protocol interpreter (INT) to command the execution of the critical operations of one or more routing protocols by the secure device. The sensitive or critical portions of a routing protocol are executed in a secure and reliable manner in the secured device, for example of a chip card type.

20 Claims, 2 Drawing Sheets

ROUTER ASSOCIATED TO A SECURE DEVICE

This application is based on and claims the benefit of French Patent Application no 0854201 filed on Jun. 24, 2009 which is incorporated by reference herein in its entirety

TECHNICAL FIELD

The present invention concerns a router associated to a secure device within a packet based communication network.

BACKGROUND

A router is an information technology device included in a given communication network, such as a packet based network, whose function it is, in particular, to provide a junction between the given network and at least one other network, to direct data packets through the given network, and to transmit data packets from the given network to another network.

An attack against a router can bring about a malfunction of the router and various detrimental consequences, such as breakdown of the network, an interruption of service, a disruption to the activities of the users of the network, and substantial cost and negative advertising.

Such attacks often target routers because of their critical role in a network, and they can be of different types, such as a "man in the middle" attack to monitor data traffic within the network, a denial of service attack, or a subversion attack.

In subversion attacks, the attacker can be connected to the router with current user rights or possibly with administrator rights. Such rights authorize the attacker to modify the router's configuration and to control all processes executed in the router.

There are various routing protocols, such as the OSPF ("Open Shortest Path First"), the BGP ("Border Gateway Protocol"), or the RIP (Routing Information Protocol") protocols to direct data traffic through networks. During a subversion attack, the attacker can modify the process that generates messages of the routing protocol in order to use fake addresses and to direct data packets over bad routing. For example, data packets can be directed towards equipment belonging to the attacker so that the latter can access such data packets in order potentially to be able to modify them. Such bad routing information can be propagated to all routers in the network.

To ensure secure data exchanges between two routers of a network, certain mechanisms authenticate all messages generated by the routing protocol used by the network. This authentication is carried out by means of secret keys that are deployed and memorized in all routers of the network and which can be changed by each router's administrator. Such authentication mechanisms have the following disadvantages:

when an attacker is in possession of a router's administrator rights, he/she can modify the secret keys required for the router's security functions, an attacker can potentially change the implementation of the routing protocol to modify the content of messages sent or received, and secret key management is very onerous, to the extent that secret keys are generally never changed.

There is therefore a need for a packet based network operator to prevent or limit the consequences of an attack against a network router, in which an attacker could direct all or part of data traffic to a corrupted network address.

SUMMARY

One goal of the invention is to remedy the abovementioned disadvantages by improving the security of routers in a packet based network.

To accomplish this goal, the invention provides a router associated to a secure device and included in a communication network, comprising an interface to communicate with the secure device following an authentication of the router by the secure device, characterized in that it comprises means to command the execution of at least one portion of a routing protocol by the secure device.

Advantageously, the router according to the invention can execute certain protocol portions considered to be non-critical for the routing protocol and can deport the execution of other protocol portions considered to be critical for the routing protocol to the secure device. The protocol portions executed in the secure device cannot be executed and/or modified by the router itself, and are considered to be reliable, as opposed to other protocol portions executed by the router that are considered not to be reliable as the router can be manipulated by a potential attacker.

According to another characteristic of the invention, the router may comprise means to identify a portion of a routing protocol to be executed and to determine which component, out of the router and the secure device, is to execute the identified routing protocol portion. This identification may be performed by means of a matches table between first routing protocol portions and the router and between second routing protocol portions and the secure device, the first and second protocol portions being distinct, and fully defining the routing protocol.

By way of example, the said at least one routing protocol portion may consist in an algorithm for the creation of a control message required by the routing protocol or in an algorithm for the creation or modification of a routing table memorized in the secure device.

The invention also concerns a secure device associated to a router included in a communication network, comprising an interface to communicate with the router following an authentication of the router by the secure device, characterized in that it comprises means to execute at least one portion of a routing protocol further to a command of the router.

According to another characteristic of the invention, the secure device may comprise means to sign a message produced further to the execution of the said at least one portion of a routing protocol and to transmit the signed message to the router. The message produced and signed by the secure device has a reliable and unmodifiable content; any modification of the message by the router would render the message useless because the modified message would not be accepted by other routers because of a bad signature.

For example, the secure device may be a chip card. Advantageously, data and algorithms relating to a routing protocol can be irreversibly and securely memorized on the chip card.

The invention further concerns a method for the secure execution of a part of the routing protocol within a communication network, characterized in that it comprises, in a router associated to a secure device, the following steps:

identification of a portion of a routing protocol to be executed, determination as to which component, out of the router and a secure device associated to the router, is to execute the identified routing protocol portion, and further to an authentication of the router by the secure device, command of the execution of the portion of a routing protocol by the secure device, and in that it comprises, in the secure device, a step of executing the portion of a routing protocol by a command of the router.

BRIEF DESCRIPTION OF THE DRAWINGS

The present invention and the benefits thereof shall be better understood upon examining the description below, which makes reference to the attached figures, in which.

DETAILED DESCRIPTION

Figure 1:
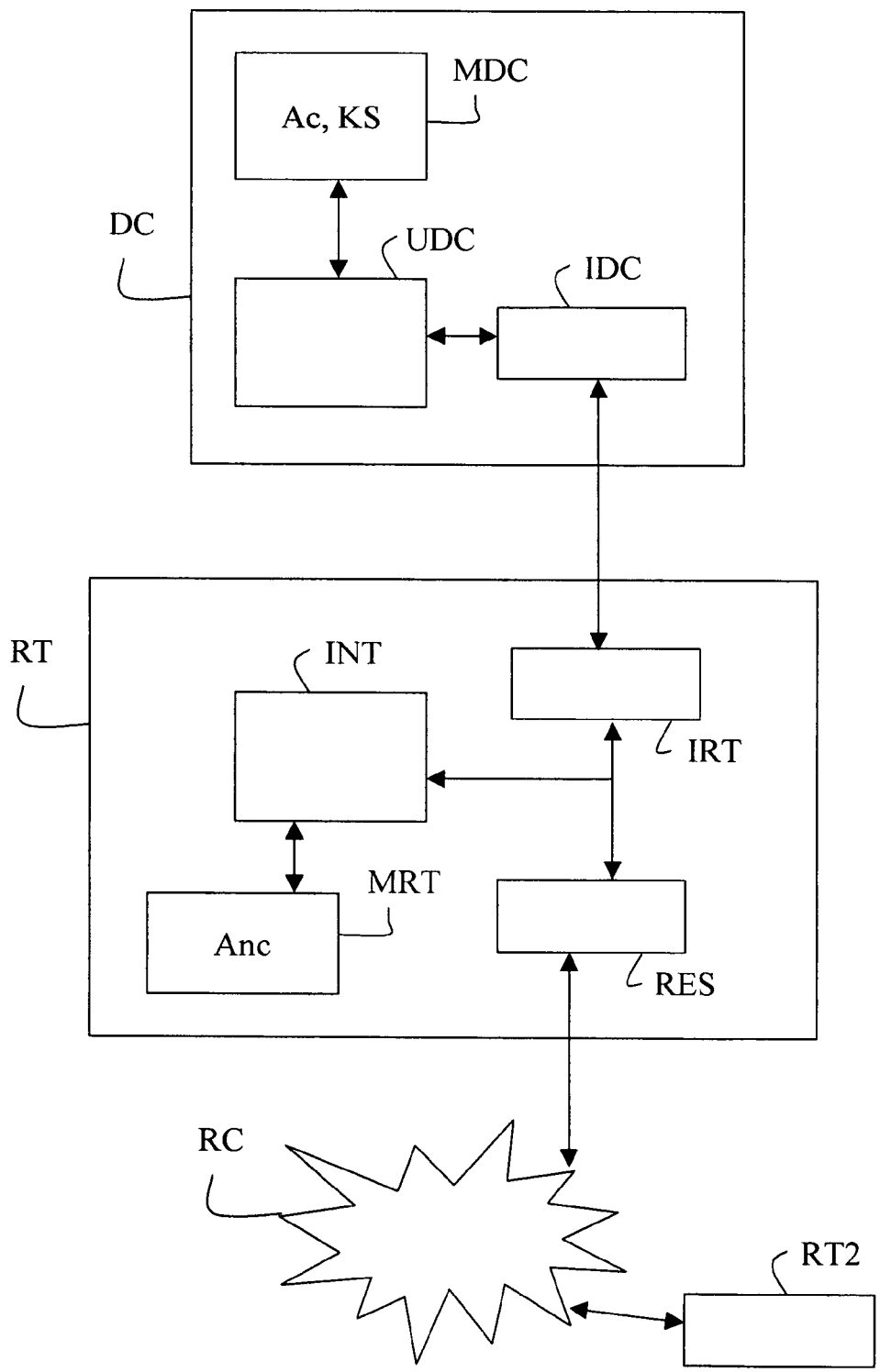
FIG. 1 is a schematic block diagram of a router associated to a trusted device and included in a packet based network according to the invention.

As an introduction, a few terms and concepts that are helpful for understanding the invention are defined below.

A router is an information technology device in a communication network intended for routing messages. More particularly, the router controls the transmission of messages through the network and can determine the nearest network node to which a data packet should be sent so that the said packet will reach a predetermined target within the network as quickly as possible. For this purpose, the router has in its memory a routing table containing the shortest paths to other routers within the network as a function of metrics associated to such paths. In other words, a routing table is a table of matches between the network address of the targeted network location and the next node to which the router is to send the message. This process, called "routing", takes place in the "network" layer of the OSI ("Open System Interconnected") model and is generally associated to the IP ("Internet Protocol") protocol.

A router may be a computer dedicated to the routing function, comprising in particular a motherboard, a microprocessor, an operating system, and the necessary network resources to communicate with other components such as servers or other routers.

A routing protocol enables the exchange of routing information among routers as well as definition of the modes of exchange among the different applications used, for example, sending a message or an acknowledgement of receipt for a message, and, more particularly, definition of the characteristics of an exchanged message, such as identifiers of the routers concerned by the exchange of the message, its nature and content, and the expected processing of the message.

A router has different functionalities related to three levels:
 a control level that compiles a routing table based on information collected by the router's routing protocol(s),
 a data level that combines retransmission functionalities to route packets towards a desired destination, and
 a management level that manages the router, e.g. from a command line interface or by a network administrator.

The invention adds a trusted level to the router by means of a trusted device associated to the router. The trusted level offers functionalities enabling supply of reliable information further to secured processing of secure data. For example, the trusted device is supplied by a network equipment supplier and configured by the network operator or the network administrator.

An example of obtention of a trusted device, such as a chip card, by the network operator is described below. A card manufacturer supplies a chip card as well as a secret initialization key to a network equipment supplier. The said secret initialization key enables the supplier to install applets, i.e. programs loaded onto and executed within the chip card, data, in particular concerning a router associated to the card, protocol algorithms, and secret keys in the card. When the installation is complete, depending on the arrangements made between the supplier and the network operator, the supplier has the option to either remove the secret key and then the installed applets can no longer be modified, or else not to remove it, in which case the installed applets can be updated. The supplier can then sell the router associated to the chip card to the network operator. The trusted device becomes associated to the router when the latter is configured and used for the first time. Depending on the operator's policy, the trusted device can once and for all be associated to the router, or else it can be modified or updated by means of equipment dedicated to that function.

In reference to FIG. 1, a router RT is included in a communication network and associated to a trusted device DC. The router RT is suitable for communicating with at least one other router RT2 of the packet based network.

The communication network RC is for example an IP ("Internet Protocol") type high speed network such as the Internet or an intranet, or even a company specific private network.

The router RT comprises an access interface IRT to communicate with the trusted device DC, an INT protocol interpreter to execute portions of routing protocol considered to be "non-critical", a memory MRT in which are memorized, in particular, predetermined algorithms corresponding to non-critical protocol portions, hereafter referred to as non-critical algorithms Anc, and an RES network interface to communicate with components of the communication RC, such as another router RT2.

The trusted device DC comprises an access interface IDC to communicate with the router RT, a processing unit UDC to execute portions of routing protocol considered to be "critical", and a memory MDC in which are memorized, in particular, secret keys KS and predetermined algorithms corresponding to "critical" portions of routing protocol, hereafter referred to as critical algorithms Ac.

All algorithms corresponding to all portions of a routing protocol are therefore memorized in a shared manner in the router and the trusted device, and the implementation of the routing protocol is thus distributed, as concerns its non-critical portion, in the router, and as concerns its critical portion, in the routing device. The critical portions of the protocol must therefore be distinct from and complementary to non-critical portions of the protocol so that the critical and non-critical portions entirely define the routing protocol. By way of example, the said critical portions can consist in algorithms to generate certain information, e.g. in order to construct or authenticate messages, or in order to create or modify databases or a routing table. The said critical portions may consist in functions an attacker would like to use to carry out a subversion attack. The non-critical protocol portions executed by the router are considered not to be secure or reliable, while the critical protocol portions are considered to be both secure and reliable.

Therefore, the trust level manages critical protocol portions, while the control level manages non-critical protocol portions.

The trusted device DC is a secure, impregnable device that implements a process execution isolation concept. The trusted device DC is, for example, a removable contact or contactless chip card, also called a microcontroller card or integrated circuit card, accessible from the router via a means of communication, for example of the radiofrequency type.

According to another example, the trusted device is a Hardware Security Module HSM having cryptography functions, and can be of the plug-in electronic card type integrated in the router, or of the external box type that is connected to the router via a contactless or contact connection.

The router RT and the trusted device DC communicate between them via the respective access interfaces IRT and IDC by means of shared communication keys. For example, the router RT can request an identification code from the trusted device DC before establishing a communication with the latter. These communication keys prevent any execution of the trusted device on another router.

The router RT and the trusted device DC are associated, i.e. they can be interconnected by means of a wired or wireless connection. For example, the trusted device DC may be a contactless or contact connection chip card that can be introduced into an appropriate reader of the router RT.

Optionally, the router RT comprises a presence controller to detect whether the router RT is indeed associated to the trusted device DC, and to supply power to the trusted device if applicable.

Figure 2:
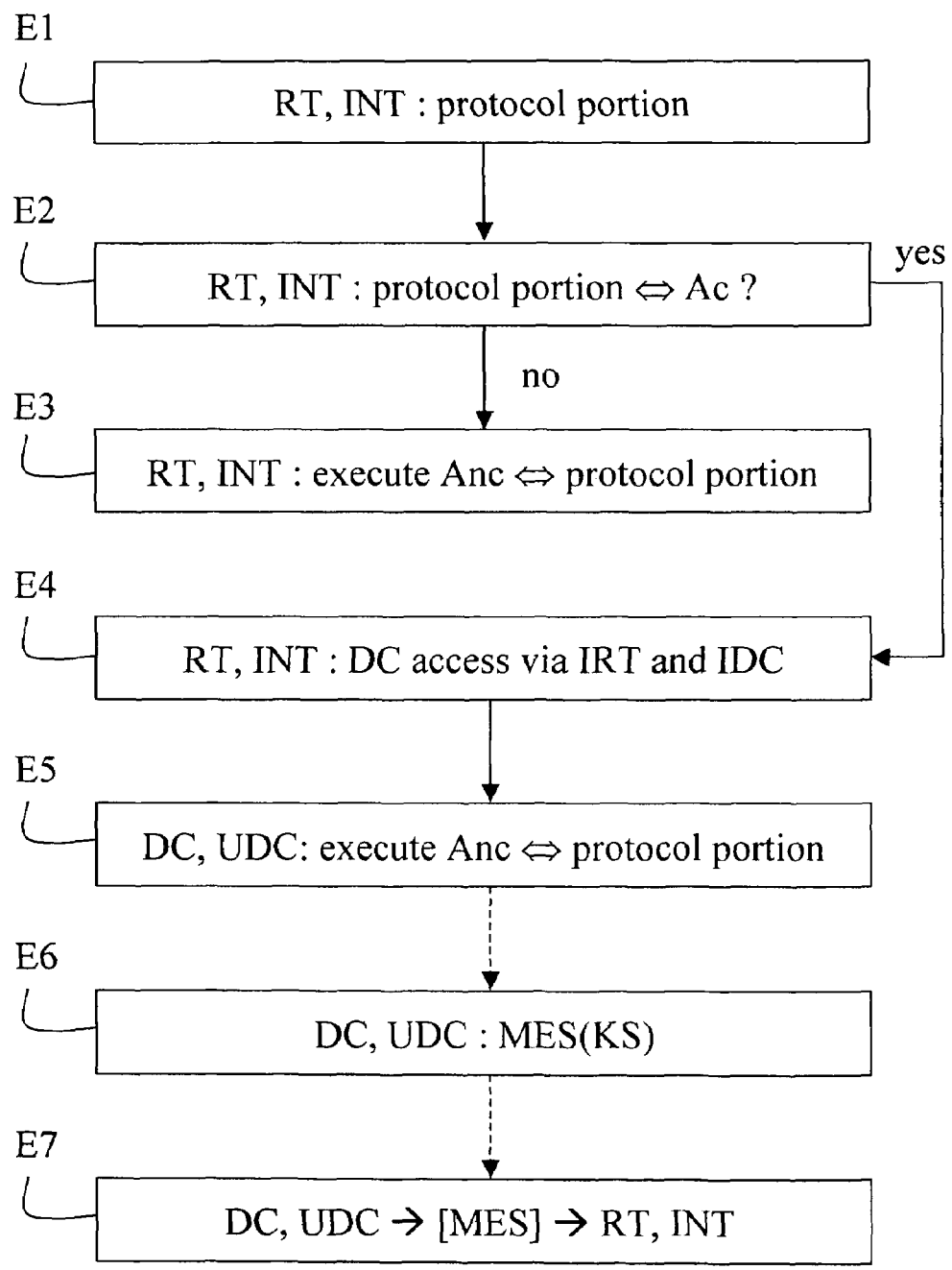
FIG. 2 is an algorithm of an execution method of a portion of a routing protocol within a trusted device associated to a router according to the invention.

In reference to FIG. 2, an execution method of a portion of a routing protocol within a trusted device associated to a router according to the invention comprises steps E1 to E7 automatically executed partially in the router and partially in the trusted device according to the invention.

In step E1, depending on the routing protocol used by the router RT, an event triggers execution of a portion of the protocol by the router. This event can be for example the reception of a request by the router via the network interface RES from another router of the communication network RC. The protocol interpreter INT identifies the portion of the protocol to be executed, In step E2, the router's protocol interpreter INT determines whether the identified protocol portion can be executed by the router or by the trusted device, i.e. it verifies whether the protocol portion is a critical algorithm Ac or a non-critical algorithm Anc. For this purpose, the protocol interpreter consults e.g. a table of matches in which each protocol portion is associated to the router or to the trusted device.

If this protocol portion is non-critical, the router itself executes the Anc algorithms corresponding to this non-critical protocol portion in step E3.

If this protocol portion is critical and therefore associated to the trusted device in the table of matches, the protocol interpreter requests access to the trusted device DC via the IRT and IDC access interfaces in step E4. Following authentication of the router with the trusted device, these two components can communicate between them, and the protocol interpreter commands to the trusted device the execution of the critical protocol portion, for example by transmitting to it, in particular, an identifier for that protocol portion or for the matching algorithm.

In step E5, the processing unit UDC of the trusted device executes the critical algorithms Ac memorized in the memory MDC and matching the critical protocol portion, e.g. by means of the identifier received from the critical algorithm Ac.

In the optional step E6, depending on the nature of the critical algorithm executed in step E5, the processing unit UDC produces a message MES at the end of the execution of the protocol portion and signs the message produced by means of a secret key KS memorized in the memory MDC. By way of example, step E6 is executed if the critical algorithm corresponds to the creation of a control message requested by the routing protocol used, and step E6 is executed if the critical algorithm corresponds to the modification of a routing table memorized in the trusted device.

In the optional step E7, the processing unit UDC transmits the signed message MES to the protocol interpreter INT, which can then process that message as if the said message had been produced by the protocol interpreter, i.e. for example transmitting the signed message to another router. As the message MES is signed, the router can no longer modify the content of the message.

According to an embodiment of the invention, the trusted device DC executes critical portions of at least one routing protocol, such as the OSPF, BGP, or RIP protocol. According to a particular example of the invention, the trusted device DC executes the HELLO protocol, which is a critical portion of the OSPF protocol enabling routers to detect one another in order to exchange routing information among them. Each router transmits a control message towards neighboring routers at regular time intervals, the message containing a cryptographic sequence number that is incremented over time. The Hello protocol makes it possible to set up adjacency relationships among routers and, more particularly, to elect a designated router DR and a backup designated router BAR for each local network within a communication network according to the OSPF protocol.

A control message sent by a given router further contains information concerning the known neighboring routers and the status of the connections between the given router and the neighboring routers.

An example of implementation of the HELLO protocol in the trusted device DC associated to the router RT is described below.

As soon as a router is operational, it regularly sends a HELLO control message via all router's interfaces dedicated to the OSPF protocol. A router having received a HELLO message transmits a response to the neighboring router. For this purpose, the interpreter INT identifies the HELLO protocol as a critical protocol portion of the OSPF protocol and commands the execution of HELLO message construction algorithms to the trusted device. The processing unit UDC then constructs a HELLO message and signs it before transmitting it to the router's protocol interpreter INT, which can in turn transmit the message to another router.

Processing of the HELLO protocol by the secure device thus ensures that the HELLO message is authentic and that it originates from a safe source.

In a subversion attack against a router, the attacker can modify the operating system, the routing protocol and the secret keys included in a router that is not associated to a trusted device.

According to the invention, the attacked router can become isolated to prevent propagation of the attack to the entire network. Indeed, if the trusted device is not used, the route becomes isolated as it can no longer access the algorithms and data that are included in the trusted device and comply with the requested routing protocol.

For example, for the OSPF routing protocol, the attacked router can no longer correctly sign and authenticate HELLO messages, and the other routers no longer recognize that attacked router. The attacked router disappears from the routing tables known to the other routers and the data traffic will no longer pass through the attacked router.

The router thus becomes isolated in the following cases:
when the attacker modifies communication keys shared between the router and the trusted device or disconnects the trusted device from the router, messages produced by the router can no longer be signed and authenticated by the trusted device, and therefore such messages cannot be sent to neighboring routers,
when the attacker modifies data of a control message received, the attacker cannot sign the message, and the trusted device cannot accept the control message because the router cannot authenticate the message. Thereafter, the attacked router will not receive any more information from the neighboring routers and can no longer answer their messages, and when the attacker modifies data of a control message signed by the trusted device and which is to be sent to another router, the attacker cannot sign the modified message, and such modified message will not be accepted by another router.

The invention claimed is:

1. An apparatus, comprising:
    a router, associated to a secure device, and communicatively coupled to a communication network;
    wherein the router is located between the communication network and the secure device;
    wherein the router comprises an interface to communicate with the secure device following an authentication of the router by the secure device;
    wherein the router is configured to execute at least a first portion of a routing protocol that is divided into the first portion and a second portion;
    wherein the router comprises means to command an execution of at least the second portion of the routing protocol by the secure device, wherein the first and second portions of the routing protocol are distinct.

2. The apparatus according to claim 1, wherein the router comprises means to identify a portion of the routing protocol to be executed and to determine which unit, out of the router and the secure device, is to execute the identified portion of the routing protocol.

3. The apparatus according to claim 2, wherein the router comprises a table of matches between the first portion of the routing protocol and the router and matches between the second portion of the routing protocol and the secure device;
    wherein the first and second portions of the routing protocol fully define the routing protocol.

4. The apparatus according to claim 3, wherein at least one portion of the routing protocol is an algorithm for creation of a control message requested by the routing protocol.

5. The apparatus according to claim 2, wherein at least one portion of the routing protocol is an algorithm for creation of a control message requested by the routing protocol.

6. The apparatus according to claim 1, wherein at least one portion of the routing protocol is an algorithm for creation of a control message requested by the routing protocol.

7. The apparatus of claim 1, wherein the first portion of the routing protocol is a non-critical portion of the routing protocol;
    wherein the second portion of the routing protocol is a critical portion of the routing protocol.

8. The apparatus of claim 1, wherein the routing protocol comprises an Open Shortest Path First (OSPF) protocol;
    wherein the second portion of the routing protocol comprises a HELLO protocol.

9. The apparatus of claim 1, wherein the router is configured to receive a signed message from the secure device;
    wherein the router is unable to modify content of the signed message.

10. The apparatus of claim 1, wherein the second portion of the routing protocol comprises one or more algorithms to at least one of construct a message, authenticate a message, create or modify a database, or create or modify a routing table.

11. An apparatus, comprising:
    a secure device, associated to a router that is communicatively coupled to a communication network;
    wherein the secure device is configured to be isolated from the communication network by the router;
    wherein the secure device comprises an interface to communicate with the router following an authentication of the router by the secure device;
    wherein the secure device comprises means to execute at least a first portion of a routing protocol by a command of the router;
    wherein the routing protocol comprises the first portion and a second portion that are distinct;
    wherein the secure device is configured to execute the second portion of the routing protocol and does not execute the first portion of the routing protocol.

12. The apparatus according to claim 11, wherein the secure device comprises means to produce a message and sign it further to the execution of the second portion of the routing protocol and to transmit the signed message to the router.

13. The apparatus according to claim 12, wherein the secure device is a chip card.

14. The apparatus according to claim 11, wherein the secure device is a chip card.

15. The apparatus of claim 11, wherein the second portion of the routing protocol comprises one or more predetermined algorithms.

16. The apparatus of claim 15, wherein the secure device comprises a processing unit and one or more secret keys for execution of the one or more predetermined algorithms.

17. The apparatus of claim 15, wherein the one or more predetermined algorithms comprise algorithms to at least one of construct a message, authenticate a message, create or modify a database, or create or modify a routing table.

18. A method for secure execution of a portion of a routing protocol within a communication network, said method comprising the following steps in a router associated to a secure device:
    identifying a portion of a routing protocol to be executed,
    determining which unit, out of the router and a secure device associated to the router, is to execute the identified portion of the routing protocol portion, wherein the router is configured to execute a first portion of the routing protocol and the secure device is configured to execute a second portion of the routing protocol, wherein the first and second portions of the routing protocol are distinct, and
    further to an authentication of the router by the secure device, commanding the execution of the identified portion of the routing protocol by the secure device if the identified portion belongs to the second portion of the routing protocol,
    and in that it comprises, in the secured device, a step of executing the identified portion of the routing protocol by the command of the router.

19. The method of claim 18, wherein the step of executing the identified portion of the routing protocol by the command of the router comprises the step of:
    executing the identified portion through employment of at least one secret key.

20. The method of claim 18, wherein the step of executing the identified portion through employment of the at least one secret key comprises the steps of:
    producing a message;
    signing the message with the secret key; and
    transmitting the signed message to the router.

* * * * *